(12) United States Patent
Miermont et al.

(10) Patent No.: US 10,667,232 B2
(45) Date of Patent: May 26, 2020

(54) WIRELESS COMPUTER NETWORK AND METHOD FOR LOCATING A NODE IN SAID NETWORK

(71) Applicant: IDOSENS, Maylan (FR)

(72) Inventors: Sylvain Miermont, Grenoble (FR); Nicolas Deparis, Tencin (FR)

(73) Assignee: IDOSENS, Maylan (FR)

( * ) Notice: Subject to any disclaimer, the term of this patent is extended or adjusted under 35 U.S.C. 154(b) by 0 days.

(21) Appl. No.: 15/869,404

(22) Filed: Jan. 12, 2018

(65) Prior Publication Data
US 2019/0223136 A1  Jul. 18, 2019

(51) Int. Cl.
| | |
|---|---|
| H04W 64/00 | (2009.01) |
| H04W 24/10 | (2009.01) |
| G01S 5/14 | (2006.01) |
| G01S 5/00 | (2006.01) |
| G01S 13/87 | (2006.01) |
| G01S 13/82 | (2006.01) |

(52) U.S. Cl.
CPC .............. *H04W 64/00* (2013.01); *G01S 5/00* (2013.01); *G01S 5/14* (2013.01); *G01S 13/825* (2013.01); *G01S 13/878* (2013.01); *H04W 24/10* (2013.01)

(58) Field of Classification Search
None
See application file for complete search history.

(56) References Cited

U.S. PATENT DOCUMENTS

| | | | | |
|---|---|---|---|---|
| 6,975,619 | B1* | 12/2005 | Byers | H04M 3/42357 370/351 |
| 7,450,951 | B2* | 11/2008 | Vimpari | G01S 5/02 370/229 |
| 9,736,649 | B1* | 8/2017 | Do | G01S 5/0263 |
| 9,813,877 | B1* | 11/2017 | Chrabieh | H04W 4/043 |
| 2001/0040506 | A1* | 11/2001 | Boulay | B60R 25/1018 340/539.1 |
| 2003/0007504 | A1* | 1/2003 | Berry | H04L 69/16 370/465 |
| 2004/0028017 | A1* | 2/2004 | Whitehill | H04L 63/0492 370/338 |
| 2004/0259571 | A1* | 12/2004 | Joshi | H04W 64/00 455/456.1 |
| 2008/0165058 | A1* | 7/2008 | Ayachitula | G01S 7/4021 342/359 |
| 2010/0074133 | A1* | 3/2010 | Kim | G01S 5/0289 370/252 |

(Continued)

OTHER PUBLICATIONS

Thierry Lestable, *Location-enable(TM) IoT Network: "geo-LoRating" your assets*, 1, Sep. 18, 2015.

*Primary Examiner* — Ayaz R Sheikh
*Assistant Examiner* — Tarell A Hampton
(74) *Attorney, Agent, or Firm* — Muncy, Geissler, Olds & Lowe, P.C.

(57) ABSTRACT

A wireless local network and method integrating the locating and the seamless roaming of mobile nodes. The network includes a server constituting the core of the network, fixed access points providing the low-level protocol, fixed anchors providing the locating function and nodes comprising sensors and actuators according to the end purpose of the network. The fixed anchors determine a distance measurement with the nodes by time of flight of radio waves, with the nodes behaving as an active radio deflector.

11 Claims, 3 Drawing Sheets

(56) References Cited

U.S. PATENT DOCUMENTS

| | | | |
|---|---|---|---|
| 2011/0207477 A1 | 8/2011 | Siomina et al. | |
| 2013/0010617 A1* | 1/2013 | Chen | H04W 64/00 370/252 |
| 2013/0165150 A1 | 6/2013 | Cho et al. | |
| 2013/0316740 A1* | 11/2013 | Scarafia | H04W 64/00 455/456.5 |
| 2014/0074874 A1* | 3/2014 | Fraccaroli | G06F 16/284 707/758 |
| 2014/0187257 A1* | 7/2014 | Emadzadeh | G01S 5/0242 455/456.1 |
| 2015/0119077 A1* | 4/2015 | Buchheim | G01S 1/042 455/456.1 |
| 2015/0181552 A1* | 6/2015 | Bajko | H04W 64/00 455/456.2 |
| 2015/0230055 A1* | 8/2015 | Smith | H04W 4/029 455/456.3 |
| 2016/0088429 A1* | 3/2016 | Gao | H04W 4/02 455/456.1 |
| 2016/0148451 A1* | 5/2016 | Menkveld | G07C 9/00126 340/5.71 |
| 2016/0302044 A1* | 10/2016 | Bottazzi | H04W 4/04 |
| 2016/0337808 A1* | 11/2016 | Narasimha | H04W 4/04 |
| 2016/0353238 A1* | 12/2016 | Gherardi | H04W 4/021 |
| 2016/0374045 A1* | 12/2016 | Pandharipande | G01S 1/68 |
| 2016/0377697 A1* | 12/2016 | Sella | G01S 5/0289 342/451 |
| 2017/0135063 A1* | 5/2017 | Bartov | H04W 64/003 |
| 2018/0027421 A1* | 1/2018 | Chrabieh | H04W 16/20 455/446 |
| 2018/0213492 A1* | 7/2018 | Xia | H04W 56/001 |
| 2018/0219869 A1* | 8/2018 | Kumar | H04W 12/12 |
| 2018/0231668 A1* | 8/2018 | Xia | H04W 64/00 |
| 2018/0249306 A1* | 8/2018 | Pandharipande | H04Q 9/00 |
| 2018/0288569 A1* | 10/2018 | Wang | H04W 4/023 |

* cited by examiner

WIRELESS COMPUTER NETWORK AND METHOD FOR LOCATING A NODE IN SAID NETWORK

TECHNICAL FIELD OF THE INVENTION

The invention relates to a wireless computer network and a method for locating a node in said network.

This invention relates to the field of computer networks and wireless telecommunication as well as to the field of locating, in particular via radio waves, mobile objects.

Prior Art

In the field of wireless networks for mobile objects, certain networks are based on the principle of a meshed topology. "Intelligence", distributed in the network makes it possible to route the packets exchanged between mobile objects according to the traffic conditions, failure of certain nodes of the network, etc., but can cause instabilities and render these networks unpredictable in certain conditions.

Other types of networks are more hierarchical, with a separation of the roles between the mobile objects that wish to connect to the network, and the infrastructure of the network that has to be connected by stable links, and over which the manager of the network has a direct and predictable control. This is the case with the so-called "Wifi®" computer networks and cellular telephony networks (which today are considered as a data flow among others).

In these hierarchical networks, each mobile object is explicitly associated with one of the access points (or base station) which constitutes the infrastructure, with each access point constituting a "cell" of the network. This allows the network to delegate all of the low-level management for this mobile object to only one of the access points. In order to allow for mobility, the protocols of these networks provide intracellular transfer procedures. However, these procedures require an active participation of the mobile objects, and therefore a consumption of energy.

In the case of failure of an access point, all of the mobile objects that were connected to it lose the capacity to communicate until they are associated explicitly with a neighboring access point. This requirement of reliability generally leads to the deployment of robust but complex and expensive access points, and this curbs the densification of the networks. This is all the more so true when different frequencies have to be used between neighboring cells in order to limit interference between access points, and the optimum management of the frequencies becomes a very complex problem in the case of a dense network.

In certain types of networks, the locating via infrastructure of mobile objects makes it possible to offer high value-added services. When the precise location of each access point is known, time of flight measurement techniques during the exchange of packets, measurement techniques of the power received from the radio signal and the arrival angle of the signal, make it possible to locate a mobile object using measurements of at least two access points.

More measurements, given by more access points, make it possible to increase the precision of the locating. However, given the hindrances to densification mentioned hereinabove, precision remains in general limited.

U.S. Patent 2011/207477 (SIOMINA IANA) describes a method for determining the position of a node by measuring the radio distance between wireless network elements and a "target" node. U.S. Patent 2013/165150 (CHO CHAE HWAN) describes a method for measuring a position using a positioning access point. The publication: Thierry Lestable: "Location-Enable™ IoT Network: "geo-LoRa-ting" your assets", Sep. 18, 2015, discloses a wireless computer network according to the preamble of claim 1, as well as a method for calculating the position of a "target" node based on distance measurements taken by access points. In these networks of prior art, the calculation accuracy of the position of the "target" node is however not optimal and the distance measurement generates a substantial energy consumption on side node.

The invention aims to overcome the aforementioned technical problems. In particular, an objective of the invention is to improve the calculation accuracy of the position of a "target" node. Another objective of the invention is to be able to increase the density at least cost of the points that measure their distances to the "target" node, and this while still preserving the battery of said node.

Divulgation of the Invention.

The solution proposed by the invention is a wireless computer network comprising a server and at least one node suitable for communicating with said server, with the data exchanges between said node and said server passing through at least one access point, said node and said access point are provided with radio transmitters-receivers, said node being suitable for communicating with said access point. This network is remarkable in that:
- at least three anchors are suitable for communicating with the server, with the data exchanges between said anchors and said server passing through at least one access point,
- the node is suitable for, following a command transmitted by the server, being placed, for a determined period of time, in a mode that allows it to transmit a response to a query message transmitted by an anchor for a radio distance measurement,
- each anchor is suitable for, following a command transmitted by the server, taking the radio distance measurement between said anchor and the node, and transmitting this measurement to said server.

The anchors make it possible to improve the calculation accuracy of the position of the node while still increasing the density at least cost of the measuring points. Furthermore, the node is placed, on a command from the server, in a mode wherein it responds to the queries of the anchors only during a limited time window. The node can as such remain on stand-by the rest of the time and, in fact, preserve the battery thereof.

The local wireless network of the invention is built according to a "tree" topology with a clear functional separation between:
- the nodes (mobile objects), noted as N on the illustrations;
- the portion of the infrastructure which is used for exchanging data constituted of one or more access points, noted as PA, and of a single network server, noted as S;
- the subpart of the infrastructure dedicated for locating constituted of anchors, noted as A.

The management of the network, including the low-level management ("2/data connection" layer and upper layers of the OSI model) is provided by the network server. The access points provide the radio interface ("1/physical" layer of the OSI model) between the nodes and the server, provide certain temporal aspects of the protocol and inform the server of certain characteristics of the radio frames received.

In a network according to the invention, the data connection protocol is of the ALOHA asynchronous type, with low energy and a long range, wherein the communications are always initiated by a node in the direction of the network server, with at each time a short time window during which the network server can respond to the node that has just transmitted.

From the standpoint of nodes, the association is therefore carried out only with the network server. For the data exchange protocol, the access points are "transparent". The term "transparence" means in terms of the invention the fact that the node and the anchors (which are for the network only nodes with special functions) communicate with the server without needing to explicitly select an access point which will receive the frame transmitted by said node. This is a characteristic of the communication between the node and the anchors on the one hand and the server on the other hand, which is independent of the communication between a node and an anchor (different frame format). In other terms, starting from the moment when a node is within the range of at least one access point, the communication between this node and the server is provided. In order for this to function, the data connection protocol of the network of the invention is designed to support a latency between the access points and the network server which can reach a hundred or so milliseconds.

As such, the mobility of the nodes is supported without requiring that they re-associate at each change in the access point, and therefore by limiting the energy consumption of the nodes that can remain on stand-by. In addition, if a node is within the range of several access points, the redundancy of the paths between this node and the network server increases the robustness of the connection.

In relation to the existing networks, a network according to the invention makes it possible to use access points that are functionally simpler and with less constraints concerning reliability, which tends to decrease the cost thereof, and favor the densification, even over-densification in order to provide redundant coverage of each node by a multitude of access points.

For locating, a network according to the invention uses infrastructure elements that are separated from the access point or points: anchors. These anchors are functionally simpler than the access points described hereinabove and they use the same low-power data network as the nodes.

The function of the anchors is, on a command from the network server, to take a radio distance measurement between themselves and a node in particular of the network. As their exact position is known, the crossing of the measurements of several anchors makes it possible to calculate the position of a node in particular.

Prior to the taking of measurements by the anchors, the server will have temporarily activated the "locating" mode of the node wherein the latter listens to the radio channel and responds to the queries from the anchors.

The radio distance measurement in the wireless network of the invention can be based on an active measurement of the time of flight, with the anchor operating as an interrogator (sending of a "ping") and the node operating as an active signal reflector (also called "active radar reflector"), responding to the "ping" signal received by a "pong" signal, with a response time that is as constant as possible. The anchor very accurately measures the time elapsed between the transmitting of the "ping" and the receiving of the "pang" and subtracts from this time the response time of a node (a known constant of the system). The remaining time corresponds to the round-trip propagation time of the radio signal. Considering that radio wave propagates at a speed that is very close to that of light it is possible to deduce the distance between the anchor that has sent the "ping" and the node that has responded.

In order to improve the position measurements in buildings with several levels, in the presence of walkways and shelving in a building of the warehouse type, each anchor and node according to the invention can be provided with a barometer. As the altitude of the anchors is known, it will be possible to deduce the vertical position of a node by comparing the atmospheric pressure measured on the node and the atmospheric pressures measured by the nearby anchors.

Other advantageous characteristics of the invention are listed hereinbelow. Each one of these characteristics can be considered separately or in combination with the remarkable characteristics defined hereinabove, and be the object, where applicable, of one or several divisional patent applications:

According to a preferred embodiment, upon receiving the command transmitted by the server, each anchor is suitable for sending a query message to the node then timing the time that the response takes from said node to arrive, with said anchor locally calculating the distance between itself and said node, then transmits this information to the server.

According to a preferred embodiment, upon receiving the command transmitted by the server, the node is suitable for sending a validation frame to said server. This validation frame can contain a measurement of the atmospheric pressure on the node.

According to an embodiment, the server is suitable for determining an approximate location of the node from a list of access points that have received the validation frame and of the knowledge of the position of each access point, with said server being suitable for selecting the anchors that are the closest to said node.

The network can have several nodes and at least two access points, said network further comprising at least one of the following characteristics: —the access points are connected to the server by TCP/IP computer links of which the latencies are less than 300 milliseconds; —the nodes, the anchors and the access points are provided with radio transmitter-receivers that operate with the same modulation and in the same frequency band; —the radio coverage areas of the access points overlap at least partially; —the access points act on the layer 1 of the network and are transparent for the layer 2 of said network, in such a way that the communication between the nodes and the server as well as the communication between the anchor and the server, is carried out transparently, without needing to address, or to be associated explicitly with one or more access points; —data is exchanged in both directions between the nodes and the server; —the nodes communicate with the access points thanks to an asynchronous level 2 protocol, wherein all of the exchanges are initiated by a node and wherein the server has a delay that is greater than double the typical latency between server and access points for transmitting a response to a node by the intermediary of an access point; —the server is suitable for identifying frames received simultaneously by several access points, and for selecting, from those having received a frame transmitted by a node, a single access point through which a response frame can be sent; —the server is suitable for sending a frame containing commands to each anchor at any time, by the intermediary of an access point known a priori; —the server is suitable for using multiple distance measurements with a target node, carried out by more than three anchors of which the positions are known, in order to calculate the position of said target node.

According to an embodiment, the network comprises at least one of the following characteristics: —the communication between the anchors, the node and access points, uses a LoRa® spread spectrum digital modulation; —the communication between the anchors, the node and access points uses an "Industrial, Scientific, and Medical" frequency band from 2.4 GHz to 2.4835 GHz; the measurement of the distance between the node and the anchors is carried out using a radio time of flight measurement with a resolution less than 10 nanoseconds, with the anchors in an interrogator/receiver role, the node acting as an active radio deflector.

According to an embodiment, the anchors located within radio range of an interrogator anchor transmitting a distance measurement signal, and within radio range of a target node behaving as an active radio deflector, are suitable for taking an additional measurement with a resolution less than 10 nanosecond, seen from the position thereof, of the time between the signal transmitted by the interrogator anchor and the response of said target node, with this time corresponding to the pseudo-distance between said target node, the interrogator anchor and the anchor taking the additional measurement, According to an embodiment, the radio distance measurement between the node and an anchor is taken by a radio measurement of the time of flight of the response transmitted by said node to the query message of said anchor and/or by a measurement of the radio power of the response transmitted by said node to the query message of said anchor.

Another aspect of the invention relates to a method for locating a node in a wireless computer network, said network comprises a server and at least one node suitable for communicating with said server, with the data exchanges between said node and said server passing through at least one access point, said node and said access point are provided with radio transmitter-receivers, said node being suitable for communicating with said access point, with the method further comprising the following steps:

installing in the network at least three anchors suitable for communicating with the server, with the data exchanges between said anchors and said server passing through at least one access point, following a command transmitted by the server to the node, placing said node, for a determined period of time, in a mode that allows it to transmit a response to a query message transmitted by an anchor, for a radio distance measurement, following a command transmitted by the server to an anchor, taking a radio distance measurement between said anchor and the node, and transmitting this measurement to said server.

Yet another aspect of the invention relates to an alternative embodiment wherein the wireless computer network comprises a server and at least one node suitable for communicating with said server, with the data exchanges between said node and said server passing through at least one access point connected to said server by computer links, said node and said access point are provided with radio transmitter-receivers, said node being suitable for communicating with said access point, and wherein:

the network further comprises at least three anchors suitable for communicating with the server, with the data exchanges between said anchors and said server passing through at least one access point, each anchor is suitable for, following a command transmitted by the server, being placed, for a determined period of time, in a "locating" mode allowing it to transmit a response to a query message transmitted by the node for a radio distance measurement, the node is suitable for, following a command transmitted by the server, taking the radio distance measurement between said node and an anchor placed in "locating" mode, and transmitting this measurement to said server.

According to this alternative embodiment, an additional aspect of the invention relates to a method for locating a node in a wireless computer network, said network comprises a server and at least one node suitable for communicating with said server, with the data exchanges between said node and said server passing through at least one access point, said node and said access point are provided with radio transmitters-receivers, said node being suitable for communicating with said access point, with the method further comprising the following steps:

installing in the network at least three anchors suitable for communicating with the server, with the data exchanges between said anchors and said server passing through at least one access point, following a command transmitted by the server to an anchor, placing said anchor, for a determined period of time, in a "locating" mode allowing it to transmit a response to a query message transmitted by the node for a radio distance measurement, following a command transmitted by the server to the node, taking the radio distance measurement between said node and an anchor placed in "locating" mode, and transmitting this measurement to said server.

DESCRIPTION OF THE FIGURES

Other advantages and characteristics of the invention shall appear better when reading the following description of a preferred embodiment, in reference to the annexed drawings, provided by way of informative and non-limiting examples and wherein.

PREFERRED EMBODIMENTS OF THE INVENTION

In the embodiment to follow, only a minimum number of each one of the elements comprising the invention are shown: a single node, at least one and preferably at least two access points, at least three anchors and a server. In a typically deployed system, the number of nodes would be substantially higher (by a dozen to several dozen thousand), with up to a hundred or so access points, and a dozen to a thousand anchors.

Figure 1:
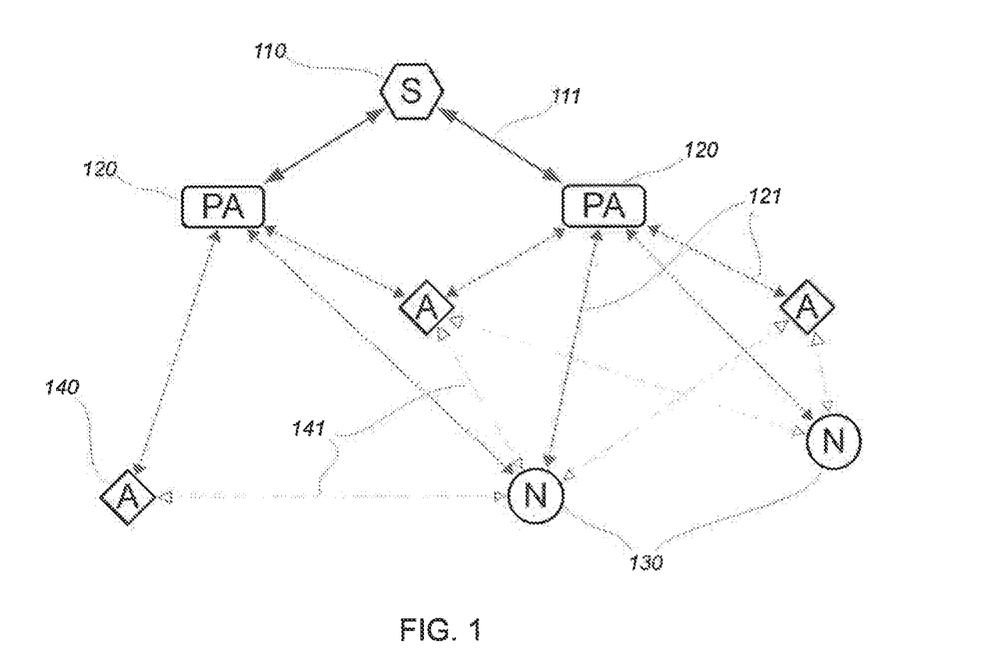
FIG. 1 shows a functional view of the various elements constituting the wireless local network of the invention.

FIG. 1 shows all of the elements of a wireless radio network in accordance with the invention and the type of communication that they can exchange.

The server (110) constitutes the core of the network, it is a generic computer running a piece of software or a set of software specific to the wireless network of the invention. It is connected to a multitude of access points (120) by Internet/intranet data connections (111) which are typically wired links (of the Ethernet, ADSL, etc. type), wireless (type Wifi, GPRS or LTE cellular) or a combination of the two, using TCP/IP protocols. The typical latency of a link is less than 100 milliseconds. The access points exchange data with the server using application protocols of the HTTP or MQTT type. According to the topology of the location wherein the network is installed, in particular when this location is not very extensive, the server (110) can be connected only to a single access point (120).

The access points (120) are each comprised of an on-board micro-computer whereon runs a reliable operating system that saves resources (typically built around a Linux core) and on an electronic board including a multitude of radio transmitter-receivers compatible with the preferred physical layer of the invention: a LoRa® modulation in the frequency band of 2.4 GHz. If needed, those skilled in the art can refer to the reference text for LoRa® modulation and application note AN1200.22 of Semtech that can be accessed from the link: http://www.semtech.com/images/datasheet/an1200.22.pdf.

These access points use this LoRa 2.4 GHz radio interface in order to establish radio links (121) with the nodes (130) and the anchors (140) which belong to the network controlled by the server (110). These links are used to exchange data bi-directionally. According to the topology of the location wherein the network is installed, different nodes (130) and anchors (140) will be within radio range of one or more access points (120). The access points and the anchors are fixed, but as the radio environment is not static, the "visibility" of each anchor by each access point can change. The nodes are considered as mobile and the "visibility" of each node by each access point can change substantially.

The nodes (130) are preferably electronic systems based on a very low-consumption microcontroller of the ARM® Cortex M4 type, a radio transmitter-receiver compatible with the LoRa modulation at 2.4 GHz, a power supply with AA alkaline batteries, and a set of sensors and/or actuators depending on the final application of the node.

The energy autonomy of these nodes is substantial because a regular recharging of thousands of nodes would render the system non-viable, and because these nodes can be installed in locations where the access is difficult or dangerous. The nodes (130) communicate by radio with the access points (120) but from a "data connection" protocol standpoint, the association and the data exchange are carried out with the server (110).

The communication between the anchors (140), the nodes (130) and the access points (120) preferably uses an "Industrial, Scientific, and Medical" frequency band from 2.4 GHz to 2.4835 GHz.

On a command from the server (110), each node (130) can be temporarily placed in an "active reflector" or "locating" mode during which it will respond to the queries coming from the anchors (140) in a temporally deterministic manner in order to be able to take radio distance measurements, preferably by measuring the time of flight of radio waves of the response transmitted by a node (130) to the query message of the anchor. This radio distance measurement can also be carried out by a measurement of the radio power of the response transmitted by a node (130) to the query message of the anchor. The radio distance measurement can further be carried out by a measurement of the time of flight of radio waves and by a measurement of the radio power. Ultimately, the radio distance measurement is carried out by a measurement of the time of flight of radio waves and/or by a measurement of the radio power.

The anchors (140) are electronic systems typically very similar to the nodes but powered by the mains or for example using a solar panel, as their radio is much more often listening in order to be able to receive commands from the server (110) with a minimum latency.

On a command from the server (110), an anchor (140) can communicate with a target node located within radio range according to a low-level protocol of radio distance measurement (141). Typically, no data is exchanged between the nodes and the anchors. These distance measurements are used by the server (110) to calculate the position of the target node.

Figure 2:
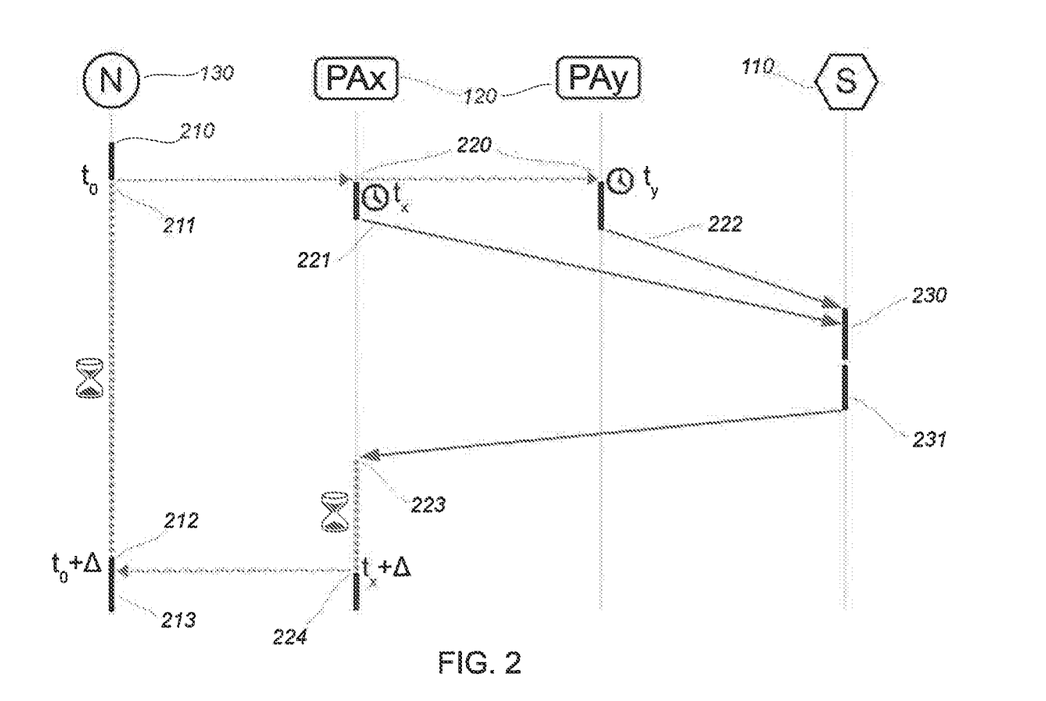
FIG. 2 shows the temporal unfolding of a data exchange between a node and the server of the network.

FIG. 2 shows the unfolding over time of a data exchange between a node (130) and the server (110), and makes it possible to show the role of the access points (120) in the seamless roaming function characteristic of the wireless network of the invention.

When it has data to be transmitted, the node (130) transmits a radio frame (210) over a predetermined radio frequency with parameters (type of modulation, transmission speed, frame format) set down by the protocol common to the system. After transmission of the frame, the node is placed on stand-by (211) at time t0 for a period A typically equal to 2 seconds.

When the access points (120) $PA_X$ and $PA_Y$, located within radio range of the node, receive the transmitted frame, they each record with their local clock at what time $t_X$ and $t_Y$ (220) the last sample of the frame was received. Advantageously, this clock is monotonous, operates at 1 MHz, with a size of 32 bits. The clocks between the access points are not aligned and they are reset to zero about every 4294 seconds.

After a possible analysis of the frame received, then compression and serialization, the two access points each transmit (221, 222) via the Internet/intranet connection the frame received to the server, along with metadata: identifier of the access point, radio frequency over which the frame was received, parameters of the modulation, level of power in dBm of the received signal strength indication (RSSI). The delay for the analysis and the transmission varies, and the server is able to receive copies of the same frame received by multiple access points during a time window (230) which can spread over several hundred milliseconds.

After having removed duplicates from the frame received, if the server has no data to transmit to the node, it de-serializes then processes the data received, and the exchange stops here.

If the server has data to be transmitted to the node, or if the data transmitted by the node requires a response, the server composes a response (231) then selects an access point from those that received the frame transmitted by the node in order to transmit the response. Typically, the server selects the access point that received the frame with the highest level of energy as it is this one that has the highest probability of managing to reliably transmit the response. In FIG. 2, it is the access point $PA_X$ which is selected by the server in order to transmit the response.

The server the transmits the frame to be transmitted via the Internet/intranet connection by explicitly indicating in the metadata that accompanies the message from the server to the access point that the response frame must be sent at time $t_X+\Delta$.

The selected access point receives (223) the response query from the server typically several hundred milliseconds before having to transmit it, it therefore has enough time to analyze the query from the server, and to prepare itself to transmit the response, even if the Internet/intranet connections with the server are affected with substantial latency (in relation to what is usually encountered in this type of network) or if this latency is experiencing substantial fluctuations.

At time $t_X+\Delta$ the access point $PA_X$ begins to transmit (224) the response to the server. At the same time, the node comes out of stand-by mode (212) and configures its radio for reception in time to successfully receive (213) the response from the server to the frame that was initially transmitted by the node.

This transmission principle does not make allow for very fast exchanges but does maximize the service life of the battery of the node which has no absolute synchronization to maintain and must simply be able to remain in stand-by during short periods (typically 2 seconds) with satisfactory accuracy (better than 10 ms). The stand-by time of the node between several successive transmissions can be long (several minutes to several hours) and can be relatively inaccurate if final the application of the node tolerates it.

Figure 3:
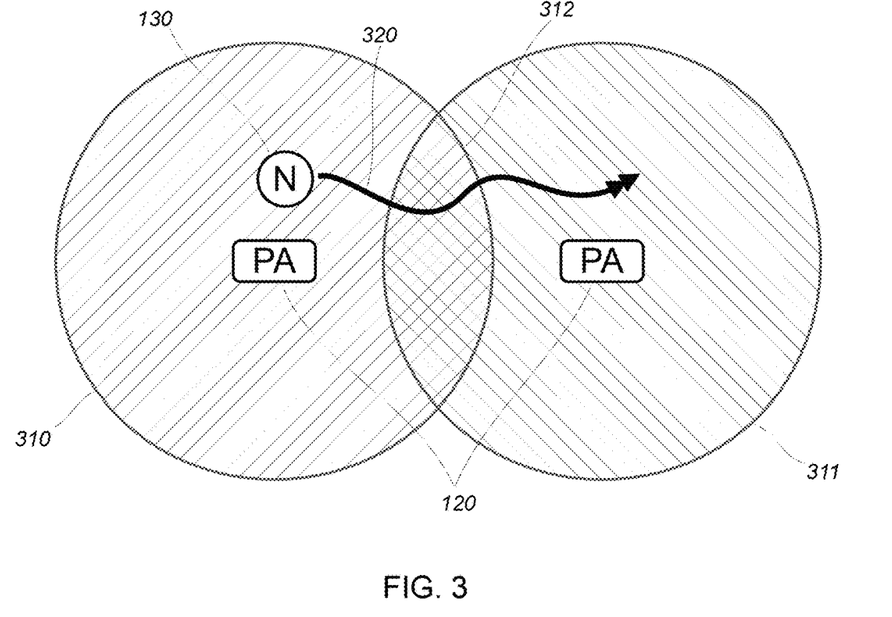
FIG. 3 shows a simplified case of node mobility and shows the capacity of the network of the invention for seamless roaming.

Another advantage of this data exchange protocol is shown in FIG. 3: allowing roaming without intervention of the node. Two access points (120) have two radio coverage areas (310, 311) that overlap partially (312). If a node (130) transmits when it is in an area (310 or 311) covered by a single access point, the upstream frame transmitted will be received by this single access point and the possible response from the server will arrive via this access point. If the node is displaced along any trajectory whatsoever (320) and is found in the area (312) covered by two access points at the time of transmitting another frame intended for the server, the server receives the frame transmitted in two copies (redundancy increasing the reliability of the transmission) and can choose to possible transmit a response by one access point or the other.

As long as the displacement speed remains modest in such a way that it is not too far away from the location where the "upstream" frame at the time when the possible "downstream" response from the server arrives, the system operates. At no time is there a requirement for the node to dialog directly with the access points in order to negotiate a transition from one to the other, or is it required for the node to spend a significant amount of time listening to the radio band in order to receive "beacon" frames transmitted by access points in order to know if it is leaving or entering a coverage area. These characteristics participate in maximizing the service life of the batteries in case of mobility of a node.

In addition with its capacity to manage mobility, the wireless transmission network of the invention makes it possible upon request to precisely locate each node by using anchors.

Figure 4:
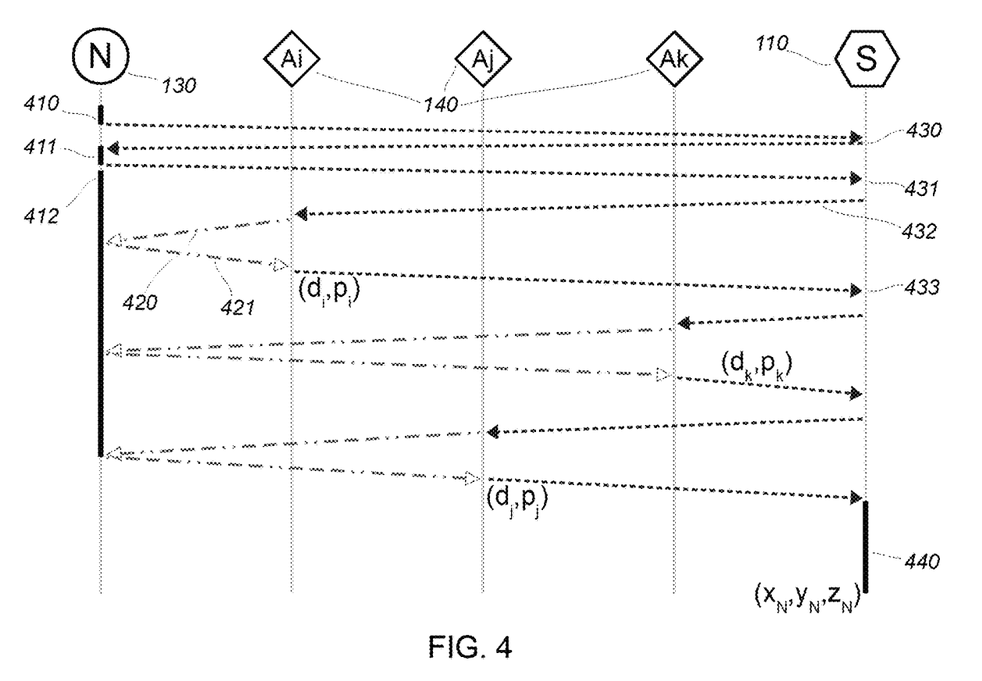
FIG. 4 shows the temporal unfolding of the measurement of the position of a node by the network.

FIG. 4 shows the temporal unfolding of the locating of a node (130) by the server (110). In order to maintain readability of the figure, the role of the access points is not shown. It is understood that all of the data exchanges between a node and the server pass through at least one access point, and likewise for the exchanges between an anchor and the server.

When a node (130) transmits (410) data to the server (110) or when it transmits at a regular interval a frame that does not contain data in order to signal the presence thereof, the server can decide upon reception of the frame transmitted by the node that it wishes to know the precise location of this node. It then sends to the node a response frame containing a command (430) which will place the node in a "locating" mode for a limited period of time, typically less than 5 seconds in order to limit power consumption.

Upon reception of this command, the node (130) begins by sending (411) a validation frame to the server (110), then enters in to "locating" mode during which the node will be just listening for query frames (or "pings") coming from the anchors (140). The validation frame (410) send by the node (130) to the server (110) typically contains a measurement of the atmospheric pressure on the node measured by a digital barometer with a typical vertical resolution of 15 to 30 cm.

After having received confirmation (431) of the activation of the "locating" mode on the node (130), the server (110) determines the approximate location of the node using the list of access points that have received the frames (430, 431) transmitted by the node and of the knowledge of the position of each access point of the system. This approximate location is for example determined by an analysis of the power of the signal containing the validation frame sent by the node to the server. Using this knowledge, the server preferably selects a limited number of anchors (140) which has a high probability of being close to the node (anchors Ai, Aj and Ak in the figure). In the case where the number of anchors (140) is already limited, for example numbering three, the server selects all of them.

Then, the server successively sends to each selected anchor a command (432) triggering one or several successive distance measurements with the node. The anchors (140) are constantly listening to the frames coming from the server transmitted by the access points, it is therefore not necessary to wait for each anchor to send a frame intended to for the server in order to be able to send it a command as a response. The access point to be used for transmitting a frame intended for each anchor is known by the server thanks to the frames transmitted by the anchors at the installation of the system. As long as the anchors and the access points are not displaced, and that the environment affecting the radio propagation is not modified substantially, this knowledge remains valid.

Upon reception of the command, the anchor Ai sends a query message (or "ping", 420) to the node then times with precision better than the nanosecond the time that the response (or "pong", 421) from the node takes to arrive. The anchor locally calculates the distance di between itself and the node, measures the atmospheric pressure pi, then transmits this information to the server (433). The anchors Aj and Ak proceed in a similar manner.

After reception of the information from at least 3 anchors, the server can initiate an iterative calculation (440) intended to determine the position [xn, yn, zn] of the node in the space that has the highest probability of returning the data observed [di, pi], [dj, pj], [dk, pk], knowing pn the pressure returned by the node, and the coordinates [x,y,z] of each anchor in an arbitrary local geometrical frame of reference.

Figure 5:
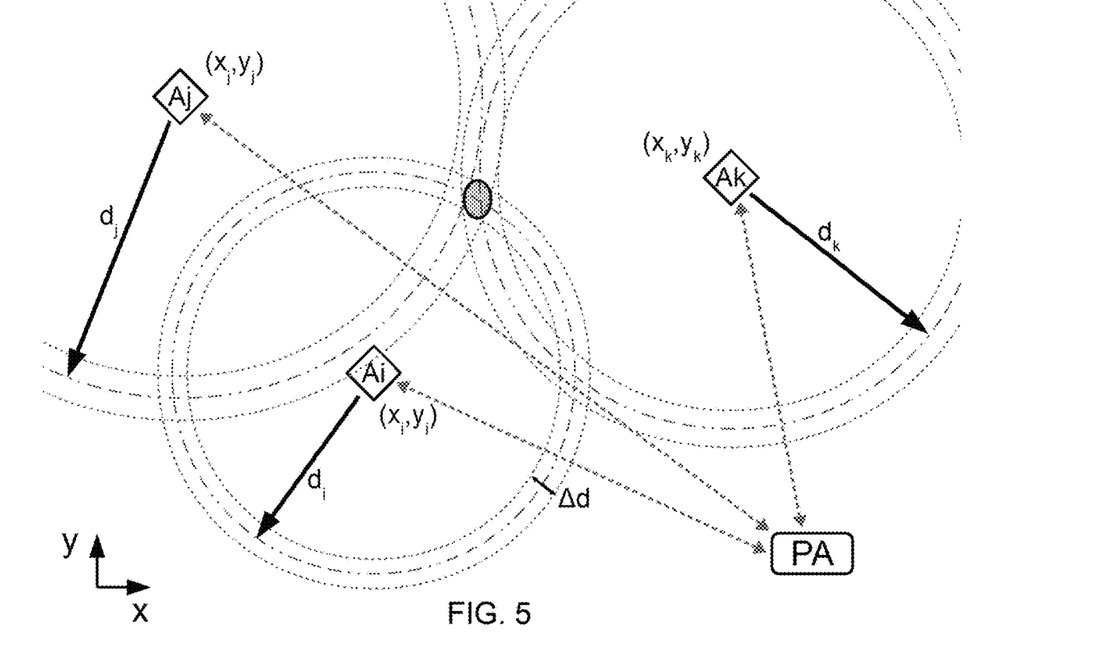
FIG. 5 shows the principle of multilateration by measurement of the time of flight which is used to determine the position of a node.

FIG. 5 shows a simplified view (as it is in two dimensions instead of three) of the mathematical problem to be resolved by the server. The distance measurements di, dj or dk are affected by a measurement uncertainty $\Delta d$, and by a bias due to the fact that the shortest path for the radio waves can be longer (but never shorter) that a direct line in space. This is a probabilistic problem that can be resolved by an iterative research method such as least squares.

Using more than 3 anchors makes it possible to more easily remove aberrant measurements and increase the accuracy of the mathematical solution. In a favorable environment, without an obstacle between the anchors and the node, the precision of the position measurement is typically of about a meter in the three dimensions. In a disturbed environment, with absorbent obstacles and surfaces that reflect radio waves, the precision can be degraded to a decametric level.

In an improved implementation of the system of the invention, the anchors that are not transmitting the query signal (for example the anchors Aj and Ak at the time when Ai is taking a distance measurement) can, by simply listening to the radio channel wherein the distance measurement is taken, time the delay, seen from the position thereof, between the query "ping" and the "pong" of the target node. This measurement provides pseudo-distance information, depending on the position of the interrogator anchor, on the anchor taking this additional measurement, and on the position of the target node. By combining N distance measurements, and M pseudo-distance measurements (with M typically 2 to 5 times greater than N), the server is able to increase the precision of the locating of the target node, or for a given precision objective, reduce the number of active distance measurements (therefore the consumption of the node).

Figure 6:
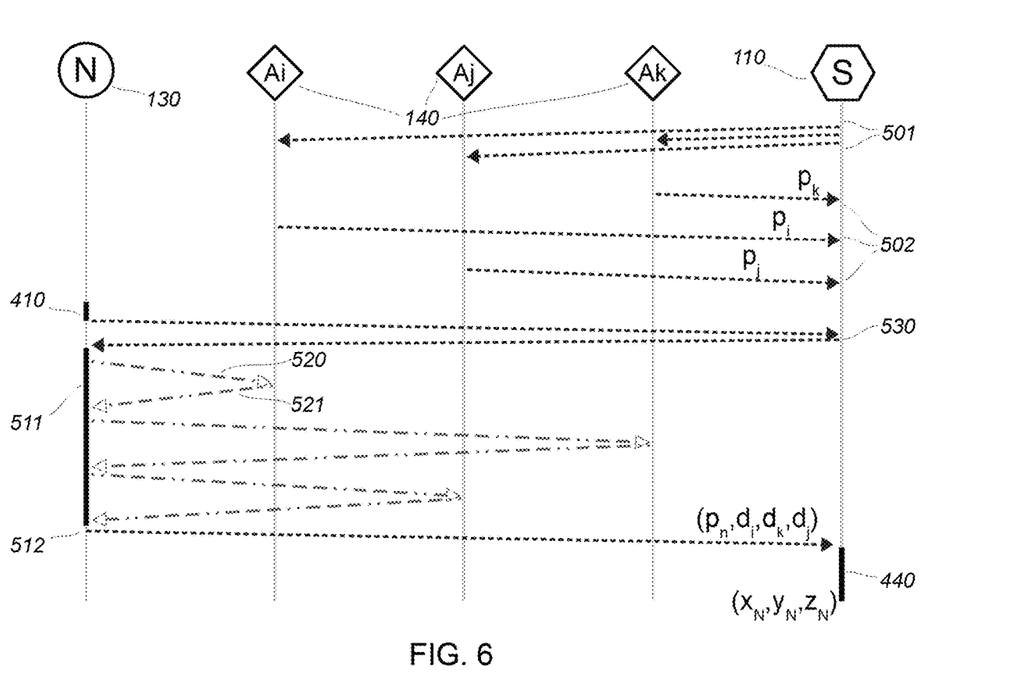
FIG. 6 shows the temporal unfolding of the measurement of the position of a node by the network, according to an alternative embodiment.

According to an alternative embodiment shown in FIG. 6, it is the nodes (130) that take the distance measurements with the anchors (140). To do this, and symmetrically with the embodiment described hereinabove, each anchor (140) is suitable for, following a command (501) transmitted by the server (110), being placed, for a determined period of time, in a "locating" mode allowing it to transmit a response to a query message transmitted by the node (130) for a radio distance measurement. And following a command (530) transmitted by the server (S, 110) to the node (N, 130), the latter takes the radio distance measurement between said node and each anchor placed in "locating" mode. This measurement is then transmitted to the server.

FIG. 6 shows the temporal unfolding of the locating of a node (130) by the server (110) according to the alternative of the method shown in FIG. 4.

In this alternative, the anchors (140) are configured by the server (110) using a configuration message (501) so that they are ready to respond to the query of a node (130). This configuration is typically carried out when an anchor (140) connects to the system of the invention. This configuration phase is not linked to the locating of a specific node and does not have to be repeated each time that a node needs to be located. It can remain constant for multiple locating sequences targeting multiples nodes.

In this alternative, the anchors (140) periodically send typically every 2 minutes, the atmospheric pressure that they measure in data frames (502).

As previously, when a node (130) transmits (410) data to the server (110) or when it transmits at regular intervals a frame that does not contain data in order to signal the presence thereof, the server can decide, upon receiving the frame transmitted by the node, that it wishes to know the precise location of this node.

The server (110) then determine the approximate located of the node (130) using the list of access points that have received the frame (410) transmitted by the node and of the knowledge of the position of each access point of the system. Using this knowledge, the server (110) preferably selects a limited number of anchors (140) that have a high probability of being close to the node (anchors Ai, Aj and Ak in FIG. 6) and with which the node (130) will have to take a radio distance measurement. The server (110) then sends to the node a response frame (530) containing a locating command and the list of anchors to be queried.

Upon receiving the command from the server (110), the node (130) switches to a measuring mode (511) when it successively queries the anchors (140) included in the list that the server sent to it. In FIG. 6, the node (130) begins by sending a query message (or "ping", 520) to the anchor Ai then times with a precision better than the nanosecond the time that the response (or "pong", 521) from the anchor Ai takes to arrive. The node (130) locally calculates the estimated distance di between itself and the anchor. The node (130) then proceeds in a similar manner for the anchors Aj and Ak.

At the end of the measuring sequence (511), the node (130) transmits to the server (110) a data frame (512) containing the atmospheric pressure Pn that it has measured as well as the distances measured with each anchor (Ai, Aj, Ak) of the list communicated by the server.

Upon reception of the frame (512) of the node (130), the server (110) proceeds as hereinabove with an iterative calculation (440) intended to determine the position [xn, yn, zn] of the node in the space starting from the measurements taken by the node, measurements of atmospheric pressure reported periodically by the anchors (Ai, Aj, Ak), and of the known position of the anchors.

The embodiments described in the preceding paragraphs show one way among others of implementing the invention. Various functionally equivalent modifications can be made to the embodiment such as described hereinabove without leaving the scope of the invention such as defined in the following claims.

The invention claimed is:

1. Wireless computer network comprising a server and at least one node suitable for communicating with said server, with the data exchanges between said node and said server passing through at least one access point, said node and said access point are provided with radio transmitters-receivers, said node being suitable for communicating with said access point,
wherein:
the network further comprises at least three anchors suitable for communicating with the server, with the data exchanges between said anchors and said server passing through at least one access point,
the node is suitable for, following a command transmitted by the server, being placed, for a determined period of time, in a mode that allows it to transmit a response to a query message transmitted by an anchor for a radio distance measurement,
each anchor is suitable for, following a command transmitted by the server, taking the radio distance measurement between said anchor and the node, and transmitting this measurement to said server,
wherein, upon receiving the command transmitted by the server, the node is suitable for sending a validation frame to said server, and
wherein the server is suitable for determining an approximate location of the node from a list of access points that have received the validation frame and of the knowledge of the position of each access point, with said server being suitable for selecting the anchors that are the closest to said node.

2. The network according to claim 1, wherein, upon receiving the command transmitted by the server, each anchor is suitable for sending a query message to the node then timing the time that the response takes from said node to arrive, with said anchor locally calculating the distance ($d_i$) between itself and said node, then transmits this information to the server.

3. Wireless computer network comprising a server and at least one node suitable for communicating with said server, with the data exchanges between said node and said server passing through at least one access point, said node and said access point are provided with radio transmitters-receivers, said node being suitable for communicating with said access point,
wherein:
   the network further comprises at least three anchors suitable for communicating with the server, with the data exchanges between said anchors and said server passing through at least one access point,
   the node is suitable for, following a command transmitted by the server, being placed, for a determined period of time, in a mode that allows it to transmit a response to a query message transmitted by an anchor for a radio distance measurement,
   each anchor is suitable for, following a command transmitted by the server, taking the radio distance measurement between said anchor and the node, and transmitting this measurement to said server,
   wherein, upon receiving the command transmitted by the server, the node is suitable for sending a validation frame to said server, and
   wherein the validation frame contains a measurement of the atmospheric pressure on the node.

4. Wireless computer network comprising a server and at least one node suitable for communicating with said server, with the data exchanges between said node and said server passing through at least one access point, said node and said access point are provided with radio transmitters-receivers, said node being suitable for communicating with said access point,
wherein:
   said network further comprises at least three anchors suitable for communicating with the server, with the data exchanges between said anchors and said server passing through at least one access point,
   the node is suitable for, following a command transmitted by the server, being placed, for a determined period of time, in a mode that allows it to transmit a response to a query message transmitted by an anchor for a radio distance measurement,
   each anchor is suitable for, following a command transmitted by the server, taking the radio distance measurement between said anchor and the node, and transmitting this measurement to said server,
   said network further comprising several nodes and at least two access points, and said network further comprising the following characteristics:
   the access points are connected to the server by TCP/IP computer links of which the latencies are less than 300 milliseconds,
   the nodes, the anchors and the access points are provided with radio transmitters-receivers that operate with the same modulation and in the same frequency band,
   the radio coverage areas of the access points overlap at least partially,
   the access points act on the layer 1 of the network and are transparent for the layer 2 of said network, in such a way that the communication between the nodes and the server as well as the communication between the anchor and the server, is carried out transparently, without needing to address, or to be associated explicitly with one or more access points,
   data is exchanged in both directions between the nodes and the server,
   the nodes communicate with the access points thanks to an asynchronous level 2 protocol, wherein all of the exchanges are initiated by a node and wherein the server has a delay that is greater than double the typical latency between server and access points for transmitting a response to a node by the intermediary of an access point,
   the server is suitable for identifying frames received simultaneously by several access points, and for selecting, from those having received a frame transmitted by a node, a single access point through which a response frame can be sent,
   the server is suitable for sending a frame containing commands to each anchor at any time, by the intermediary of an access point known a priori,
   the server is suitable for using multiple distance measurements with a target node, carried out by more than three anchors of which the positions are known, in order to calculate the position of said target node.

5. Wireless computer network comprising a server and at least one node suitable for communicating with said server, with the data exchanges between said node and said server passing through at least one access point, said node and said access point are provided with radio transmitters-receivers, said node being suitable for communicating with said access point,
wherein:
   said network further comprises at least three anchors suitable for communicating with the server, with the data exchanges between said anchors and said server passing through at least one access point,
   the node is suitable for, following a command transmitted by the server, being placed, for a determined period of time, in a mode that allows it to transmit a response to a query message transmitted by an anchor for a radio distance measurement,
   each anchor is suitable for, following a command transmitted by the server, taking the radio distance measurement between said anchor and the node, and transmitting this measurement to said server, and
   said network comprising at least one of the following characteristics:
   the communication between the anchors, the node and access points uses a LoRa® spread spectrum digital modulation,
   the communication between the anchors, the node and access points uses an "Industrial, Scientific, and Medical" frequency band from 2.4 GHz to 2.4835 GHz,
   the measurement of the distance between the node and the anchors is taken using a radio time of flight measurement with a resolution less than 10 nanoseconds, with the anchors in an interrogator/receiver role, the node acting as an active radio deflector.

6. The network according to claim 5, wherein the anchors located within radio range of an interrogator anchor transmitting a distance measurement signal, and within radio range of a target node behaving as an active radio deflector, are suitable for taking an additional measurement with a resolution less than 10 nanosecond, seen from the position thereof, of the time between the signal transmitted by the interrogator anchor and the response of said target node, with this time corresponding to the pseudo-distance between said target node, the interrogator anchor and the anchor taking the additional measurement.

7. The network according to claim 1, wherein the radio distance measurement between the node and an anchor is taken by a radio measurement of the time of flight of the response transmitted by said node to the query message of said anchor.

8. The network according to claim 1, wherein the radio distance measurement between the node and an anchor is taken by a measurement of the radio power of the response transmitted by said node to the query message of said anchor.

9. Method for locating a node in a wireless computer network, said network comprises a server and at least one node suitable for communicating with said server, with the data exchanges between said node and said server passing through at least one access point, said node and said access point are provided with radio transmitters-receivers, said node being suitable for communicating with said access point, wherein the method comprises the following steps:
  installing in the network at least three anchors suitable for communicating with the server, with the data exchanges between said anchors and said server passing through at least one access point,
  following a command transmitted by the server to the node, placing said node, for a determined period of time, in a mode that allows it to transmit a response to a query message transmitted by an anchor, for a radio distance measurement,
  following a command transmitted by the server to an anchor, taking a radio distance measurement between said anchor and the node, and transmitting this measurement to said server,
  wherein, upon receiving the command transmitted by the server, the node is suitable for sending a validation frame to said server, and
  wherein the server is suitable for determining an approximate location of the node from a list of access points that have received the validation frame and of the knowledge of the position of each access point, with said server being suitable for selecting the anchors that are the closest to said node.

10. Wireless computer network comprising a server and at least one node suitable for communicating with said server, with the data exchanges between said node and said server passing through at least one access point connected to said server by computer links, said node and said access point are provided with radio transmitters-receivers, said node being suitable for communicating with said access point, wherein:

the network further comprises at least three anchors suitable for communicating with the server, with the data exchanges between said anchors and said server passing through at least one access point,
each anchor is suitable for, following a command transmitted by the server, being placed, for a determined period of time, in a "locating" mode allowing it to transmit a response to a query message transmitted by the node for a radio distance measurement,
the node is suitable for, following a command transmitted by the server, taking the radio distance measurement between said node and an anchor placed in "locating" mode, and transmitting this measurement to said server,
wherein, upon receiving the command transmitted by the server, the node is suitable for sending a validation frame to said server, and
wherein the server is suitable for determining an approximate location of the node from a list of access points that have received the validation frame and of the knowledge of the position of each access point, with said server being suitable for selecting the anchors that are the closest to said node.

11. Method for locating a node in a wireless computer network, said network comprises a server and at least one node suitable for communicating with said server, with the data exchanges between said node and said server passing through at least one access point, said node and said access point are provided with radio transmitters-receivers, said node being suitable for communicating with said access point, wherein the method comprises the following steps:
  installing in the network at least three anchors suitable for communicating with the server, with the data exchanges between said anchors and said server passing through at least one access point,
  following a command transmitted by the server to an anchor, placing said anchor, for a determined period of time, in a "locating" mode allowing it to transmit a response to a query message transmitted by the node for a radio distance measurement,
  following a command transmitted by the server to the node, taking the radio distance measurement between said node and an anchor placed in "locating" mode, and transmitting this measurement to said server,
  wherein, upon receiving the command transmitted by the server, the node is suitable for sending a validation frame to said server, and
  wherein the server is suitable for determining an approximate location of the node from a list of access points that have received the validation frame and of the knowledge of the position of each access point, with said server being suitable for selecting the anchors that are the closest to said node.

* * * * *